US012349185B2

(12) United States Patent
Gerami et al.

(10) Patent No.: US 12,349,185 B2
(45) Date of Patent: Jul. 1, 2025

(54) METHODS FOR USE OF PRIORITY INDICATION ASSOCIATED WITH CG/SPS TRANSMISSION

(71) Applicant: Telefonaktiebolaget LM Ericsson (publ), Stockholm (SE)

(72) Inventors: Majid Gerami, Lund (SE); Jonas Fröberg Olsson, Ljungsbro (SE); Yufei Blankenship, Kildeer, IL (US); Alexey Shapin, Luleå (SE); Kittipong Kittichokechai, Järfälla (SE); Bikramjit Singh, Kirkkonummi (SE); Jianwei Zhang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 532 days.

(21) Appl. No.: 17/775,118

(22) PCT Filed: Nov. 6, 2020

(86) PCT No.: PCT/EP2020/081319
§ 371 (c)(1),
(2) Date: May 6, 2022

(87) PCT Pub. No.: WO2021/089797
PCT Pub. Date: May 14, 2021

(65) Prior Publication Data
US 2022/0400496 A1 Dec. 15, 2022

Related U.S. Application Data

(60) Provisional application No. 62/932,737, filed on Nov. 8, 2019.

(51) Int. Cl.
*H04W 72/12* (2023.01)
*H04W 72/1263* (2023.01)
(Continued)

(52) U.S. Cl.
CPC ..... *H04W 72/569* (2023.01); *H04W 72/1263* (2013.01); *H04W 72/23* (2023.01); *H04W 76/20* (2018.02)

(58) Field of Classification Search
CPC . H04W 72/1263; H04W 76/20; H04W 72/23; H04W 72/569; H04W 72/56
See application file for complete search history.

(56) References Cited

U.S. PATENT DOCUMENTS 9,860,887 B2* 1/2018 Yi .............................. H04L 5/14
2018/0092085 A1* 3/2018 Shaheen ........... H04W 36/0094
(Continued)

OTHER PUBLICATIONS

3GPP TS 38.214 V15.7.0; 3rd Generation Partnership Project; Technical Specification Group Radio Access Network; NR; Physical Layer procedures for data (Release 15); Sep. 2019; consisting of 106 pages.

(Continued)

*Primary Examiner* — Brian D Nguyen
(74) *Attorney, Agent, or Firm* — Weisberg I.P. Law, P.A.

(57) ABSTRACT

A method, system and apparatus are disclosed for priority indication. In one embodiment, a wireless device is configured to receive a priority indicator associated with a downlink control information, DCI, message, the DCI message being associated with one of an uplink-configured grant, UL-CG, configuration and a downlink-semipersistent assignment, DL-SPS, configuration; and determine a use of the priority indicator associated with the DCI message. In another embodiment, a network node is configured to determine a use of a priority indicator associated with a downlink control information, DCI, message; and send the priority indicator associated with the DCI message according to the determined use, the DCI message being associated with one of an uplink-configured grant, UL-CG, configuration and a
(Continued)

downlink-semipersistent assignment, DL-SPS, configuration.

19 Claims, 8 Drawing Sheets

(51) Int. Cl.
*H04W 72/14* (2009.01)
*H04W 72/23* (2023.01)
*H04W 72/566* (2023.01)
*H04W 76/20* (2018.01)

(56) References Cited

U.S. PATENT DOCUMENTS

2019/0349897 A1* 11/2019 Hosseini ............... H04W 72/23
2020/0296701 A1* 9/2020 Park ....................... H04L 1/1896
2020/0351057 A1* 11/2020 Yeo ........................ H04L 1/1854

OTHER PUBLICATIONS

3GPP TS 38.213 V15.7.0; 3rd Generation Partnership Project; Technical Specification Group Radio Access Network; NR; Physical layer procedures for control (Release 15); Sep. 2019; consisting of 108 pages.
3GPP TS 38.321 V15.7.0; 3rd Generation Partnership Project; Technical Specification Group Radio Access Network; NR; Medium Access Control (MAC) protocol specification (Release 15); Sep. 2019; consisting of 78 pages.
International Search Report and Written Opinion dated Feb. 1, 2021 for International Application No. PCT/EP2020/081319 filed Nov. 6, 2020; consisting of 23 pages.
3GPP TSG-RAN WG1 Meeting #98bis R1-1910545; Title: PDCCH Enhancements for NR URLLC; Agenda Item: 7.2.6.1; Source: Ericsson; Document for: Discussion, Decision: Date and Location: Oct. 14-20, 2019, Chongqing, China; consisting of 25 pages.
3GPP TSG RAN WG1 #98bis R1-1910799; Title: On UCI Enhancements for NR URLLC; Agenda Item: 7.2.6.2; Source: Nokia, Nokia Shanghai Bell; Document for: Discussion and Decision; Date and Location: Oct. 14-20, 2019, Chongqing, China; consisting of 21 pages.
3GPP TSG-RAN WG1 Meeting #98bis R1-1910850; Title: UCI enhancements for NR URLLC; Source Asia Pacific Telecom; Agenda Item: 7.2.6.2; Document for: Discussion and Decision; Date and Location: Oct. 14-20, 2019, Chongqing, China; consisting of 5 pages.
3GPP TSG-RAN WG2 #107bis Tdoc R2-1912556 (Revision of R2-1909374); Title: Reliability aspects in LCP restriction enhancement; Agenda Item: 6.7.3.2; Source: Ericsson; Document for: Discussion, Decision; Date and Location: Oct. 14-18, 2019, Chongqing, China; consisting of 9 pages.
3GPP TS 38.331 V15.3.0; 3rd Generation Partnership Project; Technical Specification Group Radio Access Network; NR; Radio Resource Control (RRC) protocol specification (Release 15); Sep. 2018; consisting of 444 pages.

* cited by examiner

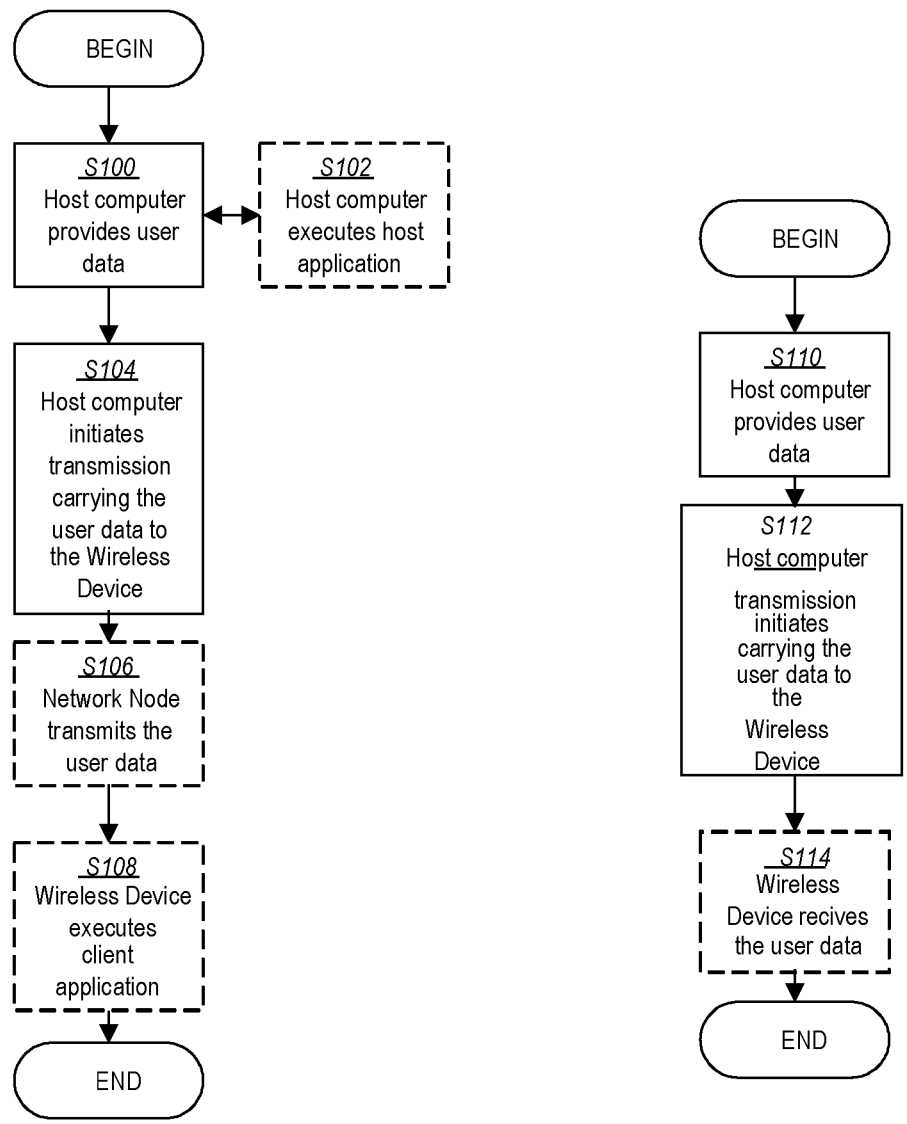

METHODS FOR USE OF PRIORITY INDICATION ASSOCIATED WITH CG/SPS TRANSMISSION

CROSS-REFERENCE TO RELATED APPLICATIONS

This application is a Submission Under 35 U.S.C. § 371 for U.S. National Stage Patent Application of International Application No.: PCT/EP2020/081319, filed Nov. 6, 2020 entitled "METHODS TO EFFICIENT USE OF PRIORITY INDICATION CONFIGURATION ASSOCIATED WITH CG/SPS TRANSMISSION," which claims priority to U.S. Provisional Application No. 62/932,737, filed Nov. 8, 2019, entitled "METHODS TO EFFICIENT USE OF PRIORITY INDICATION CONFIGURATION ASSOCIATED WITH CG/SPS TRANSMISSION," the entireties of both of which are incorporated herein by reference.

TECHNICAL FIELD

The present disclosure relates to wireless communications, and in particular, to use of a priority indication configuration associated with configured grant/semi-persistent (CG/SPS) transmission.

BACKGROUND

Third Generation partnership Project (3GPP) New Radio (NR) (also called 5th Generation (5G)) supports two types of configured grants, Type 1 and Type 2. For Type 1, the wireless device (WD) (e.g., user equipment (UE)) is radio resource control (RRC) configured with a grant that indicates all the required transmission parameters; while for Type 2, the configured grant is partly RRC configured and partly Layer 1 (L1) signaled (downlink control information (DCI) signaling). For Type 2 configured grants, the resource allocation follows an uplink (UL) grant received on the DCI and the resource then recurs periodically whose period is configured by RRC. The UL grant has a time-domain resource assignment field that provides a row index of a higher layer configured table pusch-symbolAllocation, where the indexed row defines the slot offset K2, the start and length indicator (SLIV), and the physical uplink shared channel (PUSCH) mapping type to be applied in the PUSCH transmission. The WD transmits a MAC-CE (Medium Access Control-Control Element) confirm message when the configured grant is activated or deactivated.

The RRC ConfiguredGrantConfig information element (IE) is defined in 3GPP Technical Specification (TS) 38.331, as shown below according to 3GPP TS 38.331, version 15.3.0.

ConfiguredGrantConfig Information Element

```
-- ASN1START
-- TAG-CONFIGUREDGRANTCONFIG-START
ConfiguredGrantConfig ::=                SEQUENCE {
    frequencyHopping                     ENUMERATED {intraSlot, interSlot}
OPTIONAL, -- Need S,
    cg-DMRS-Configuration                DMRS-UplinkConfig,
    mcs-Table                            ENUMERATED {qam256, qam64LowSE}
OPTIONAL, -- Need S
    mcs-TableTransformPrecoder           ENUMERATED {qam256, qam64LowSE}
OPTIONAL, -- Need S
    uci-OnPUSCH                          SetupRelease { CG-UCI-OnPUSCH }
OPTIONAL, -- Need M
    resourceAllocation                   ENUMERATED { resourceAllocationType0,
resourceAllocationType1, dynamicSwitch },
    rbg-Size                             ENUMERATED {config2}
OPTIONAL, -- Need S
    powerControlLoopToUse                ENUMERATED {n0, n1},
    p0-PUSCH-Alpha                       P0-PUSCH-AlphaSetId,
    transformPrecoder                    ENUMERATED {enabled, disabled}
OPTIONAL, -- Need S
    nrofHARQ-Processes                   INTEGER(1..16),
    repK                                 ENUMERATED {n1, n2, n4, n8},
    repK-RV                              ENUMERATED {s1-0231, s2-0303, s3-0000}
OPTIONAL, -- Need R
    periodicity                          ENUMERATED {
                                    sym2, sym7, sym1x14, sym2x14, sym4x14, sym5x14,
sym8x14, sym10x14, sym16x14, sym20x14,
                                    sym32x14, sym40x14, sym64x14, sym80x14,
sym128x14, sym160x14, sym256x14, sym320x14, sym512x14,
                                    sym640x14, sym1024x14, sym1280x14, sym2560x14,
sym5120x14,
                                    sym6, sym1x12, sym2x12, sym4x12, sym5x12,
sym8x12, sym10x12, sym16x12, sym20x12, sym32x12,
                                    sym40x12, sym64x12, sym80x12, sym128x12,
sym160x12, sym256x12, sym320x12, sym512x12, sym640x12,
                                    sym1280x12, sym2560x12
    },
    configuredGrantTimer                 INTEGER (1..64)
OPTIONAL, -- Need R
    rrc-ConfiguredUplinkGrant            SEQUENCE {
        timeDomainOffset                 INTEGER (0..5119),
        timeDomainAllocation             INTEGER (0..15),
        frequencyDomainAllocation        BIT STRING (SIZE(18)),
```

-continued

```
    antennaPort                  INTEGER (0..31),
    dmrs-SeqInitialization            INTEGER (0..1)
OPTIONAL, -- Need R
    precodingAndNumberOfLayers        INTEGER (0..63),
    srs-ResourceIndicator        INTEGER (0..15)
OPTIONAL, -- Need R
    mcsAndTBS                    INTEGER (0..31),
    frequencyHoppingOffset            INTEGER (1..
maxNrofPhysicalResourceBlocks-1)        OPTIONAL, -- NeedR
    pathlossReferenceIndex            INTEGER (0..maxNrofPUSCH-
PathlossReferenceRSs-1),
    ...
    }                                             OPTIONAL,   --
Need R
    ...
}
CG-UCI-OnPUSCH ::= CHOICE {
    dynamic         SEQUENCE (SIZE (1..4)) OF BetaOffsets,
    semiStatic      BetaOffsets
}
```

NR also supports downlink semi-persistent scheduling (DL SPS).
SPS-Config Information Element

```
-- ASN1START
-- TAG-SPS-CONFIG-START
SPS-Config ::=        SEQUENCE {
    periodicity        ENUMERATED {ms10, ms20, ms32,
ms40, ms64, ms80, ms128, ms160, ms320, ms640,
                       spare6, spare5, spare4, spare3, spare2,
                       spare1},
    nrofHARQ-Processes     INTEGER (1..8),
    n1PUCCH-AN             PUCCH-ResourceId
OPTIONAL, --NeedM
    mcs-Table        ENUMERATED {qam64LowSE}
OPTIONAL, --NeedS
    ...
}
-- TAG-SPS-CONFIG-STOP
-- ASN1STOP
```

SPS-Config field descriptions mcs-Table
Indicates the modulation and coding scheme (MCS) table the UE may use for downlink (DL) semi-persistent (SPS) (see 3GPP TS 38.214, clause 5.1.3.1. If present, the UE may use the MCS table of low-SE 64QAM table indicated in Table 5.1.3.1-3 of 3GPP TS 38.214. If this field is absent and field mcs-table in PDSCH-Config is set to 'qam256' and the activating downlink control information (DCI) is of format 1_1, the UE applies the 256QAM table indicated in Table 5.1.3.1-2 of TS 38.214. Otherwise, the UE applies the non-low-SE 64QAM table indicated in Table 5.1.3.1-1 of 3GPP TS 38.214.
n1PUCCH-AN
Hybrid Automatic Repeat reQuest (HARQ) resource for physical uplink control channel (PUCCH) for DL SPS. The network configures the resource either as format0 or format1. The actual PUCCH-Resource is configured in PUCCH-Config and referred to by its ID. See TS 38.213, clause 9.2.3.
nrofHARQ-Processes
Number of configured HARQ processes for SPS DL (see3GPP TS 38.321, clause 5.8.1).
periodicity
Periodicity for DL SPS (see TS 38.214 and TS 38.321, clause 5.8.1).

SUMMARY

Some embodiments advantageously provide methods, systems, and apparatuses for priority indication configuration.

In one embodiment, a method implemented in a network node includes one or more of: signaling a radio resource control (RRC) priority parameter associated with one of an uplink-configured grant (UL-CG) configuration and a downlink-semipersistent assignment (DL-SPS) configuration; determining a use of a priority indicator field in a downlink control information (DCI) message; and signaling the DCI message including the priority indicator field according to the determined use, the DCI being associated with the one of the UL-CG and DL-SPS configuration.

In one embodiment, a method implemented in a wireless device (WD) includes one or more of: receiving a radio resource control (RRC) priority parameter associated with one of an uplink-configured grant (UL-CG) configuration and a downlink-semipersistent assignment (DL-SPS) configuration; receiving a priority indicator field in a downlink control information (DCI) message associated with the one of the UL-CG and DL-SPS configuration; and determining a use of the priority indicator field in the DCI message.

According to one aspect of the present disclosure, a method implemented in a wireless device is provided. The method includes receiving a priority indicator associated with a downlink control information, DCI, message, the DCI message being associated with one of an uplink-configured grant, UL-CG, configuration and a downlink-semipersistent assignment, DL-SPS, configuration; and determining a use of the priority indicator associated with the DCI message.

In some embodiments of this aspect, the priority indicator includes a field in the DCI message. In some embodiments of this aspect, the method further includes receiving a radio resource control, RRC, parameter, the RRC parameter indicating a size of the priority indicator field in the DCI message. In some embodiments of this aspect, the size corresponds to a number of bits between 0 and n, n being a number greater than 0. In some embodiments of this aspect, the RRC parameter is comprised in one of a physical uplink shared channel, PUSCH, configuration and a physical downlink shared channel, PDSCH, configuration.

In some embodiments of this aspect, the method further includes receiving a radio resource control, RRC, parameter, the RRC parameter indicating a size of a priority indicator field in a DCI message associated with a dynamic scheduling of the wireless device. In some embodiments of this aspect, a size of the priority indicator field in the DCI message associated with the one of the UL-CG configuration and the DL-SPS configuration is a fixed size.

In some embodiments of this aspect, determining the use comprises determining the use of the priority indicator based at least in part on at least one of: a radio network temporary identifier associated with the DCI message, a search space associated with the DCI message, a control resource set, CORESET, associated with the DCI message, a DCI format of the DCI message and a size of the DCI message. In some embodiments of this aspect, determining the use comprises determining the use of the priority indicator based at least in part on a pre-defined rule. In some embodiments of this aspect, the method further includes using the priority indicator according to the determined use.

In some embodiments of this aspect, using the priority indicator comprises using the priority indicator to determine whether the DCI message corresponds to an activation or a release of the one of the UL-CG configuration and the DL-SPS configuration. In some embodiments of this aspect, using the priority indicator comprises using the priority indicator to validate one of an activation and a release of the one of the UL-CG configuration and the DL-SPS configuration. In some embodiments of this aspect, using the priority indicator comprises using the priority indicator to determine whether the DCI message corresponds to an activation/release of the one of the UL-CG configuration and the DL-SPS configuration, or a re-transmission request associated with the one of the UL-CG configuration and the DL-SPS configuration based at least in part on the priority indicator.

In some embodiments of this aspect, using the priority indicator comprises using the priority indicator to determine a relative priority among one of a plurality of UL-CG configurations and a plurality of DL-SPS configurations having a same priority. In some embodiments of this aspect, using the priority indicator comprises at least one of: using the priority indicator to indicate a physical channel, PHY, priority to logical channel, LCH, priority mapping set; using the priority indicator to indicate a DCI priority to logical channel, LCH, priority mapping set; overriding a priority indicated by a radio resource control, RRC, priority parameter; and/or using the priority indicator to indicate a parameter unrelated to priority.

In some embodiments of this aspect, the method further includes receiving a radio resource control, RRC, priority parameter associated with the one of the UL-CG configuration and the DL-SPS configuration. In some embodiments of this aspect, the method further includes determining a relative priority order between at least two of: a first priority indicated by a radio resource control, RRC, priority parameter associated with the one of the UL-CG configuration and the DL-SPS configuration; a second priority indicated by the priority indicator in the DCI message; a third priority for a re-transmission associated with the one of the UL-CG configuration and the DL-SPS configuration; and a fourth priority for a dynamic transmission. In some embodiments of this aspect, the method further includes determining the relative priority order based at least in part on a pre-defined rule. In some embodiments of this aspect, the third priority for the re-transmission is a same as one of the second priority and the first priority.

In some embodiments of this aspect, the priority indicator includes at least one of: a radio network temporary identifier associated with the DCI message, a search space associated with the DCI message, a control resource set, CORESET, associated with the DCI message, a DCI format of the DCI message and a size of the DCI message.

According to another aspect of the present disclosure, a method implemented in a network node is provided. The method includes determining a use of a priority indicator associated with a downlink control information, DCI, message; and sending the priority indicator associated with the DCI message according to the determined use, the DCI message being associated with one of an uplink-configured grant, UL-CG, configuration and a downlink-semipersistent assignment, DL-SPS, configuration.

In some embodiments of this aspect, the priority indicator includes a field in the DCI message. In some embodiments of this aspect, the method further includes sending a radio resource control, RRC, parameter, the RRC parameter indicating a size of the priority indicator field in the DCI message. In some embodiments of this aspect, the size corresponds to a number of bits between 0 and n, n being a number greater than 0. In some embodiments of this aspect, the RRC parameter is comprised in one of a physical uplink shared channel, PUSCH, configuration and a physical downlink shared channel, PDSCH, configuration.

In some embodiments of this aspect, the method further includes sending a radio resource control, RRC, parameter, the RRC parameter indicating a size of a priority indicator field in a DCI message associated with a dynamic scheduling of the wireless device. In some embodiments of this aspect, a size of the priority indicator field in the DCI message associated with the one of the UL-CG configuration and the DL-SPS configuration is a fixed size.

In some embodiments of this aspect, determining the use comprises determining the use of the priority indicator based at least in part on at least one of: a radio network temporary identifier associated with the DCI message, a search space associated with the DCI message, a control resource set, CORESET, associated with the DCI message, a DCI format of the DCI message and a size of the DCI message. In some embodiments of this aspect, determining the use comprises determining the use of the priority indicator based at least in part on a pre-defined rule.

In some embodiments of this aspect, determining the use comprises determining to use the priority indicator to indicate whether the DCI message corresponds to an activation or a release of the one of the UL-CG configuration and the DL-SPS configuration. In some embodiments of this aspect, determining the use comprises determining to use the priority indicator to validate one of an activation and a release of the one of the UL-CG configuration and the DL-SPS configuration. In some embodiments of this aspect, determining the use comprise determining to use the priority indicator to indicate whether the DCI message corresponds to an activation/release of the one of the UL-CG configuration and the DL-SPS configuration, or a re-transmission request associated with the one of the UL-CG configuration and the DL-SPS configuration based at least in part on the priority indicator.

In some embodiments of this aspect, determining the use comprises determining to use the priority indicator to indicate a relative priority among one of a plurality of UL-CG configurations and a plurality of DL-SPS configurations having a same priority. In some embodiments of this aspect, determining the use comprises determining to use the priority indicator to at least one of: indicate a physical channel, PHY, priority to logical channel, LCH, priority mapping set; indicate a DCI priority to logical channel, LCH, priority mapping set; override a priority indicated by a radio resource control, RRC, priority parameter; and/or indicate a parameter unrelated to priority.

In some embodiments of this aspect, the method further includes sending a radio resource control, RRC, priority parameter associated with the one of the UL-CG configuration and the DL-SPS configuration. In some embodiments of this aspect, the method further includes determining a relative priority order between at least two of: a first priority indicated by a radio resource control, RRC, priority parameter associated with the one of the UL-CG configuration and the DL-SPS configuration; a second priority indicated by the priority indicator in the DCI message; a third priority for a re-transmission associated with the one of the UL-CG configuration and the DL-SPS configuration; and a fourth priority for a dynamic transmission. In some embodiments of this aspect, the method further includes determining the relative priority order based at least in part on a pre-defined rule. In some embodiments of this aspect, the third priority for the re-transmission is a same as one of the second priority and the first priority.

In some embodiments of this aspect, the priority indicator includes at least one of: a radio network temporary identifier associated with the DCI message, a search space associated with the DCI message, a control resource set, CORESET, associated with the DCI message, a DCI format of the DCI message and a size of the DCI message.

According to yet another aspect of the present disclosure, a wireless device configured to communicate with a network node is provided. The wireless device includes processing circuitry. The processing circuitry is configured to cause the wireless device to receive a priority indicator associated with a downlink control information, DCI, message, the DCI message being associated with one of an uplink-configured grant, UL-CG, configuration and a downlink-semipersistent assignment, DL-SPS, configuration; and determine a use of the priority indicator associated with the DCI message.

In some embodiments of this aspect, the priority indicator includes a field in the DCI message. In some embodiments of this aspect, the processing circuitry is configured to cause the wireless device to receive a radio resource control, RRC, parameter, the RRC parameter indicating a size of the priority indicator field in the DCI message. In some embodiments of this aspect, the size corresponds to a number of bits between 0 and n, n being a number greater than 0. In some embodiments of this aspect, the RRC parameter is comprised in one of a physical uplink shared channel, PUSCH, configuration and a physical downlink shared channel, PDSCH, configuration.

In some embodiments of this aspect, the processing circuitry is configured to cause the wireless device to receive a radio resource control, RRC, parameter, the RRC parameter indicating a size of a priority indicator field in a DCI message associated with a dynamic scheduling of the wireless device. In some embodiments of this aspect, a size of the priority indicator field in the DCI message associated with the one of the UL-CG configuration and the DL-SPS configuration is a fixed size.

In some embodiments of this aspect, the processing circuitry is configured to cause the wireless device to determine the use by being configured to determine the use of the priority indicator based at least in part on at least one of: a radio network temporary identifier associated with the DCI message, a search space associated with the DCI message, a control resource set, CORESET, associated with the DCI message, a DCI format of the DCI message and a size of the DCI message. In some embodiments of this aspect, the processing circuitry is configured to cause the wireless device to determine the use by being configured to cause the wireless device to determine the use of the priority indicator based at least in part on a pre-defined rule.

In some embodiments of this aspect, the processing circuitry is further configured to cause the wireless device to use the priority indicator according to the determined use. In some embodiments of this aspect, the processing circuitry is configured to cause the wireless device to use the priority indicator by being configured to cause the wireless device to use the priority indicator to determine whether the DCI message corresponds to an activation or a release of the one of the UL-CG configuration and the DL-SPS configuration. In some embodiments of this aspect, the processing circuitry is configured to cause the wireless device to use the priority indicator by being configured to cause the wireless device to: use the priority indicator to validate one of an activation and a release of the one of the UL-CG configuration and the DL-SPS configuration.

In some embodiments of this aspect, the processing circuitry is configured to cause the wireless device to use the priority indicator by being configured to cause the wireless device to use the priority indicator to: determine whether the DCI message corresponds to an activation/release of the one of the UL-CG configuration and the DL-SPS configuration, or a re-transmission request associated with the one of the UL-CG configuration and the DL-SPS configuration based at least in part on the priority indicator. In some embodiments of this aspect, the processing circuitry is configured to cause the wireless device to use the priority indicator by being configured to cause the wireless device to: use the priority indicator to determine a relative priority among one of a plurality of UL-CG configurations and a plurality of DL-SPS configurations having a same priority.

In some embodiments of this aspect, the processing circuitry is configured to cause the wireless device to use the priority indicator by being configured to cause the wireless device to at least one of: use the priority indicator to indicate a physical channel, PHY, priority to logical channel, LCH, priority mapping set; use the priority indicator to indicate a DCI priority to logical channel, LCH, priority mapping set; override a priority indicated by a radio resource control, RRC, priority parameter; and/or use the priority indicator to indicate a parameter unrelated to priority. In some embodiments of this aspect, the processing circuitry is further configured to cause the wireless device to receive a radio resource control, RRC, priority parameter associated with the one of the UL-CG configuration and the DL-SPS configuration.

In some embodiments of this aspect, the processing circuitry is configured to cause the wireless device to determine a relative priority order between at least two of: a first priority indicated by a radio resource control, RRC, priority parameter associated with the one of the UL-CG configuration and the DL-SPS configuration; a second priority indicated by the priority indicator in the DCI message; a third priority for a re-transmission associated with the one of the UL-CG configuration and the DL-SPS configuration; and a fourth priority for a dynamic transmission. In some embodiments of this aspect, the processing circuitry is configured to cause the wireless device to determine the relative priority order based at least in part on a pre-defined rule. In some embodiments of this aspect, the third priority for the re-transmission is a same as one of the second priority and the first priority.

In some embodiments of this aspect, the priority indicator includes at least one of: a radio network temporary identifier associated with the DCI message, a search space associated with the DCI message, a control resource set, CORESET, associated with the DCI message, a DCI format of the DCI message and a size of the DCI message.

According to another aspect of the present disclosure, a network node configured to communicate with a wireless device is provided. The network node includes processing circuitry. The processing circuitry is configured to cause the network node to determine a use of a priority indicator associated with a downlink control information, DCI, message; and send the priority indicator associated with the DCI message according to the determined use, the DCI message being associated with one of an uplink-configured grant, UL-CG, configuration and a downlink-semipersistent assignment, DL-SPS, configuration.

In some embodiments of this aspect, the priority indicator includes a field in the DCI message. In some embodiments of this aspect, the processing circuitry is further configured to cause the network node to send a radio resource control, RRC, parameter, the RRC parameter indicating a size of the priority indicator field in the DCI message. In some embodiments of this aspect, the size corresponds to a number of bits between 0 and n, n being a number greater than 0. In some embodiments of this aspect, the RRC parameter is comprised in one of a physical uplink shared channel, PUSCH, configuration and a physical downlink shared channel, PDSCH, configuration.

In some embodiments of this aspect, the processing circuitry is further configured to cause the network node to send a radio resource control, RRC, parameter, the RRC parameter indicating a size of a priority indicator field in a DCI message associated with a dynamic scheduling of the wireless device. In some embodiments of this aspect, a size of the priority indicator field in the DCI message associated with the one of the UL-CG configuration and the DL-SPS configuration is a fixed size.

In some embodiments of this aspect, the processing circuitry is further configured to cause the network node to determine the use by being configured to cause the network node to: determine the use of the priority indicator based at least in part on at least one of a radio network temporary identifier associated with the DCI message, a search space associated with the DCI message, a control resource set, CORESET, associated with the DCI message, a DCI format of the DCI message and a size of the DCI message.

In some embodiments of this aspect, the processing circuitry is further configured to cause the network node to determine the use by being configured to cause the network node to determine the use of the priority indicator based at least in part on a pre-defined rule. In some embodiments of this aspect, the processing circuitry is further configured to cause the network node to determine the use by being configured to cause the network node to: determine to use the priority indicator to indicate whether the DCI message corresponds to an activation or a release of the one of the UL-CG configuration and the DL-SPS configuration.

In some embodiments of this aspect, the processing circuitry is further configured to cause the network node to determine the use by being configured to cause the network node to determine to use the priority indicator to validate one of an activation and a release of the one of the UL-CG configuration and the DL-SPS configuration. In some embodiments of this aspect, the processing circuitry is further configured to cause the network node to determine the use by being configured to cause the network node to: determine to use the priority indicator to indicate whether the DCI message corresponds to an activation/release of the one of the UL-CG configuration and the DL-SPS configuration, or a re-transmission request associated with the one of the UL-CG configuration and the DL-SPS configuration based at least in part on the priority indicator.

In some embodiments of this aspect, the processing circuitry is further configured to cause the network node to determine the use by being configured to cause the network node to determine to use the priority indicator to indicate a relative priority among one of a plurality of UL-CG configurations and a plurality of DL-SPS configurations having a same priority. In some embodiments of this aspect, the processing circuitry is further configured to cause the network node to determine the use by being configured to cause the network node to at least one of: indicate a physical channel, PHY, priority to logical channel, LCH, priority mapping set; indicate a DCI priority to logical channel, LCH, priority mapping set; override a priority indicated by a radio resource control, RRC, priority parameter; and/or indicate a parameter unrelated to priority.

In some embodiments of this aspect, the processing circuitry is further configured to cause the network node to send a radio resource control, RRC, priority parameter associated with the one of the UL-CG configuration and the DL-SPS configuration. In some embodiments of this aspect, the processing circuitry is further configured to cause the network node to determine a relative priority order between at least two of: a first priority indicated by a radio resource control, RRC, priority parameter associated with the one of the UL-CG configuration and the DL-SPS configuration; a second priority indicated by the priority indicator in the DCI message; a third priority for a re-transmission associated with the one of the UL-CG configuration and the DL-SPS configuration; and a fourth priority for a dynamic transmission.

In some embodiments of this aspect, the processing circuitry is further configured to cause the network node to determine the relative priority order based at least in part on a pre-defined rule. In some embodiments of this aspect, the third priority for the re-transmission is a same as one of the second priority and the first priority. In some embodiments of this aspect, the priority indicator includes at least one of: a radio network temporary identifier associated with the DCI message, a search space associated with the DCI message, a control resource set, CORESET, associated with the DCI message, a DCI format of the DCI message and a size of the DCI message.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

DETAILED DESCRIPTION

Figure 1:
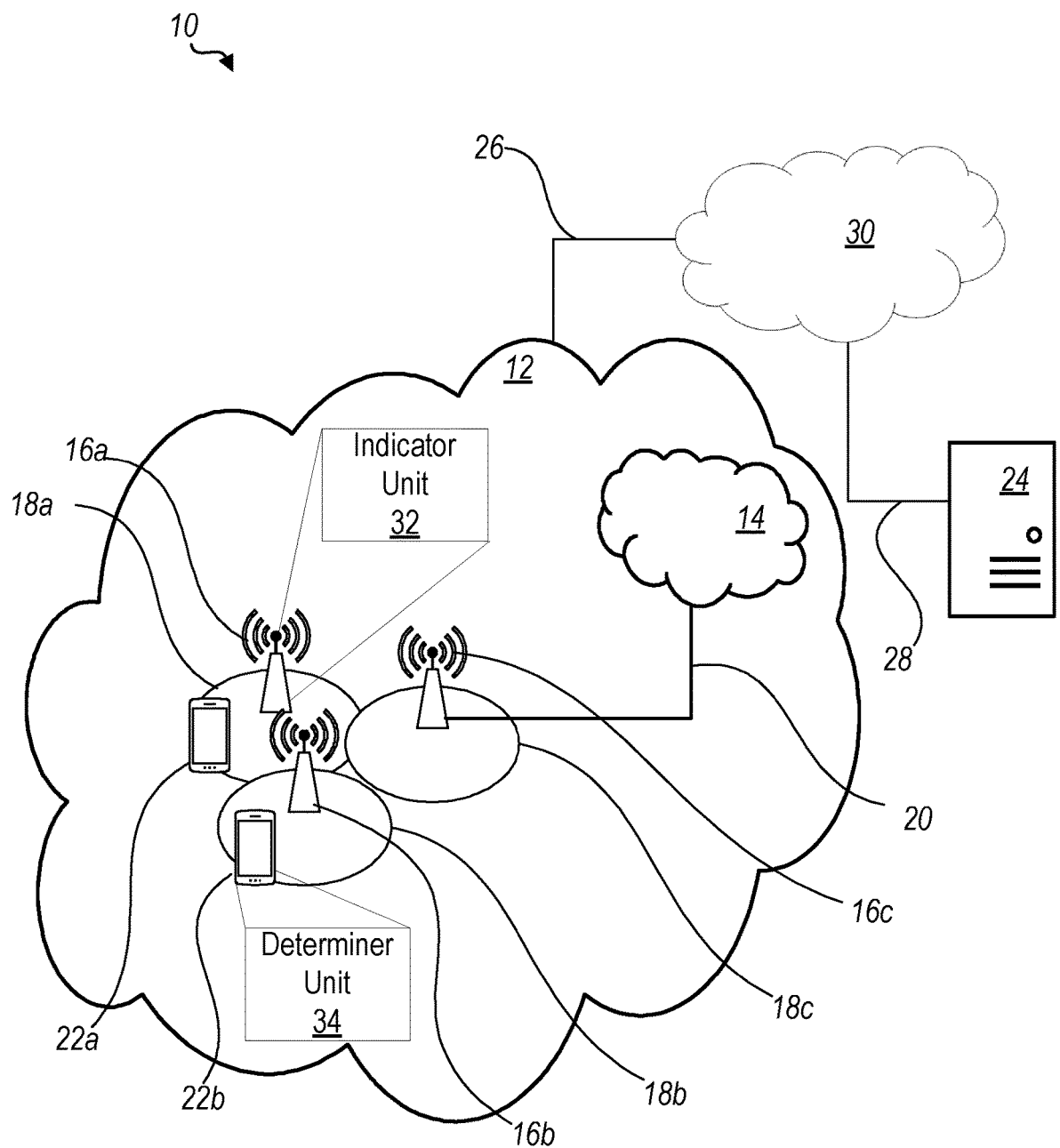
FIG. 1 is a schematic diagram of an exemplary network architecture illustrating a communication system connected via an intermediate network to a host computer according to the principles in the present disclosure.

RAN1 #98bis Considerations:

A 2-level physical (PHY) priority of dynamic grant (DG) physical uplink shared channel (PUSCH) at least for PHY-layer collision handling may be determined by a PHY indication/signaling.

A 2-level PHY priority of configured grant (CG) PUSCH at least for PHY-layer collision handling may be determined by an explicit indication (as a new RRC parameter) in each CG configuration for Type 1 and Type2 CG PUSCH.

For further study (FFS), whether/how or not to further have in Type2 CG PUSCH activation (FFS to complement or overwrite) the RRC configured indication and if so, the applicable DCI formats.

RAN2 #107bis Considerations:

A single logical channel (LCH) can be mapped to multiple CG configurations.

Multiple logical channels (LCHs) can be mapped to a single CG configuration.

Based on considerations in RAN1 #98bis, there might be one bit in a new DCI (DCI format 0-2 and 1-2). Then, if the new DCI is used for activation or release of a configuration in UL-CG/DL-SPS, that bit may be useless since for UL-CG/DL-SPS the priority is indicated by an RRC parameter.

According to RAN2 considerations, an LCH can be mapped to multiple CG configurations. This may mean that two CGs that are overlapping in time may in the MAC LCP (Logical Channel Prioritization) procedure be deduced to have the same MAC-level priority. However, there is no statement which of the CGs MAC should prioritize. The RAN1 has considered what MAC should do in the LCP procedure—only that the 2-level PHY prioritization is for at least PHY-layer collision handling.

The DCI bit may be able to be saved or used for other applications. The PHY-layer indication for priority indication may not be applicable for all transmissions, e.g., the system information, paging messages, or transmission scheduled with DCI 0_0/DCI 1_0 without priority indication. In that case, rules may be defined to describe the behavior.

Some embodiments propose arrangements for using a priority indicator, e.g. field bit in DCI for other applications and/or for saving the bit. Some embodiments in the present disclosure may increase the efficiency of bit usage of DCI signaling.

Before describing in detail exemplary embodiments, it is noted that the embodiments reside primarily in combinations of apparatus components and processing steps related to use of priority indication configuration associated with configured grant/semi-persistent (CG/SPS) transmission. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, determining a "use" of a priority indicator is described. In such embodiments, the term "use" may be intended broadly to also encompass potential options which may include ignoring the priority indicator.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g. a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

In some embodiments, control information on one or more resources may be considered to be transmitted in a message having a specific format. A message may comprise or represent bits representing payload information and coding bits, e.g., for error coding.

Receiving (or obtaining) control information may comprise receiving one or more control information messages (e.g., DCI message). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication/indicator (e.g., a priority indication/indicator, a table, bit, bitmap, DCI field, RRC parameter, CORESET, search space, DCI format, DCI size, RNTI, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for a more efficient use of priority indication configuration associated with configured grant/semi-persistent (CG/SPS) transmission as compared with known arrangements.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an indicator unit 32 which is configured to one or more of: signal a radio resource control (RRC) priority parameter associated with one of an uplink-configured grant (UL-CG) configuration and a downlink-semipersistent assignment (DL-SPS) configuration; determine a use of a priority indicator field in a downlink control information (DCI) message; and signal the DCI message including the priority indicator field according to the determined use, the DCI being associated with the one of the UL-CG and DL-SPS configuration.

A wireless device 22 is configured to include a determiner unit 34 which is configured to one or more of: receive a radio resource control (RRC) priority parameter associated with one of an uplink-configured grant (UL-CG) configuration and a downlink-semipersistent assignment (DL-SPS) configuration; receive a priority indicator field in a downlink control information (DCI) message associated with the one of the UL-CG and DL-SPS configuration; and determine a use of the priority indicator field in the DCI message.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indicator unit 32 configured to perform network node methods discussed herein, such as the methods discussed with reference to FIG. 7 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a determiner unit 34 configured to perform WD methods discussed herein, such as the methods discussed with reference to FIG. 8 as well as other figures.

Figure 2:
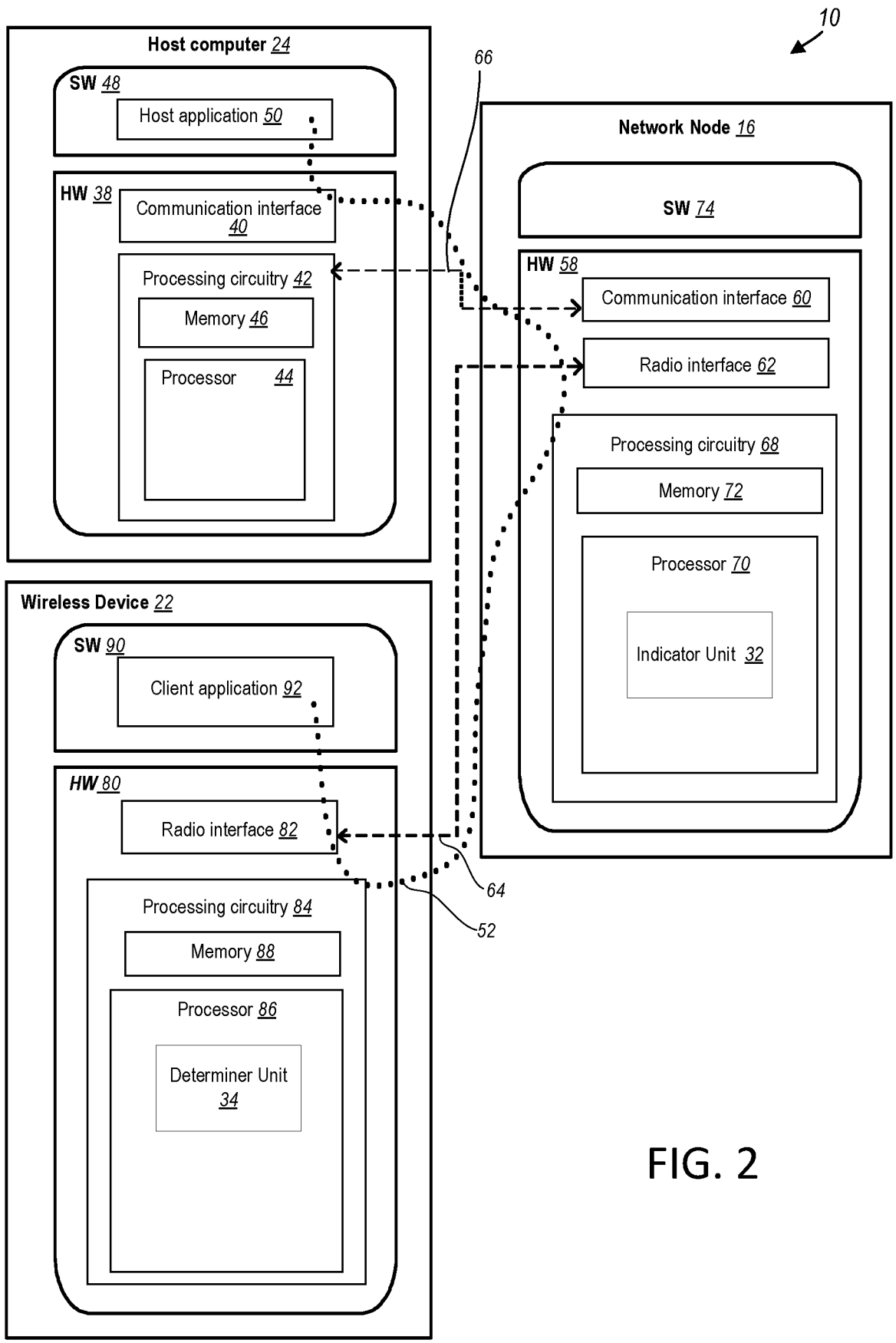
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as indicator unit 32, and determiner unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
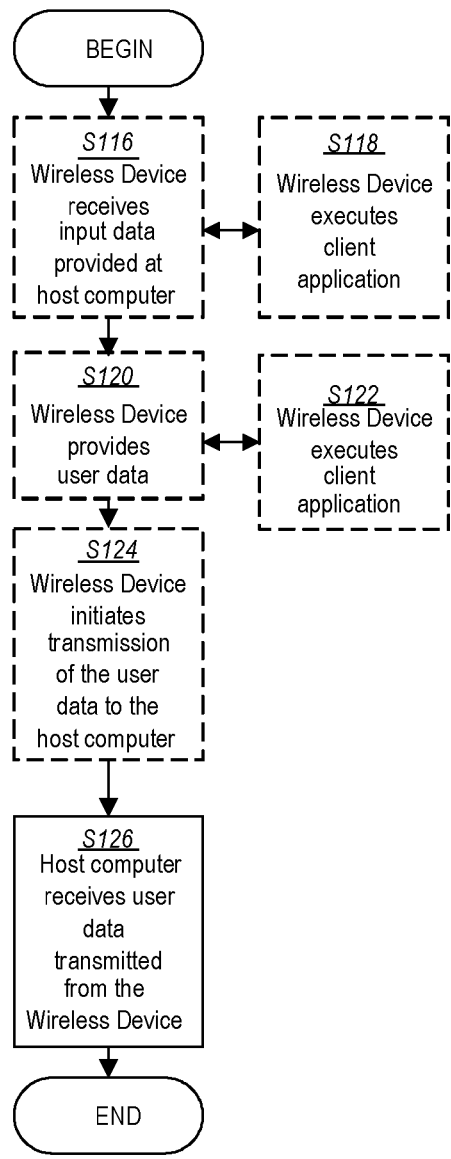
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
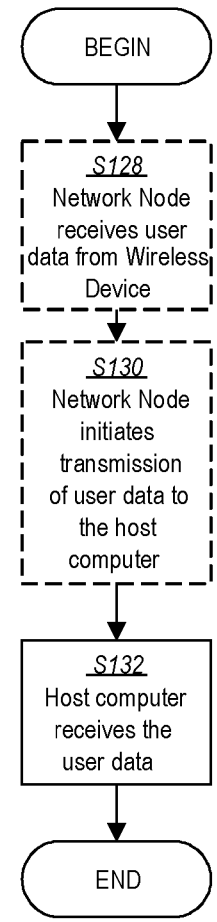
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130).

In a third step, the host computer 24 receives the user data carried in the transmission initiated by the network node 16 (Block S132).

Figure 7:
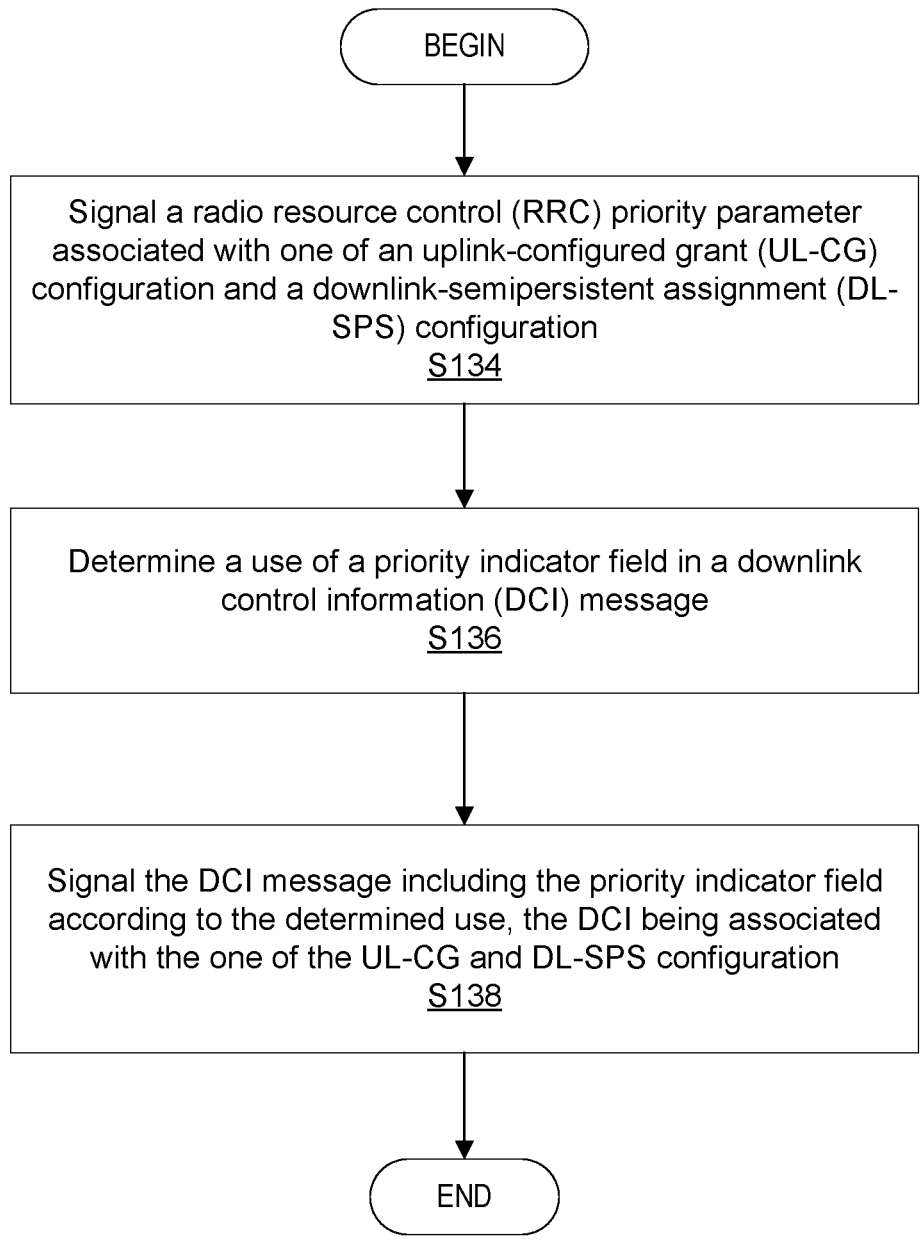
FIG. 7 is a flowchart of an exemplary process in a network node for indicator unit according to some embodiments of the present disclosure.

FIG. 7 is a flowchart of an exemplary process in a network node 16 according to some embodiments of the present disclosure. One or more Blocks and/or functions and/or methods performed by the network node 16 may be performed by one or more elements of network node 16 such as by indicator unit 32 in processing circuitry 68, processor 70, communication interface 60, radio interface 62, etc. according to the example method. The example method includes signaling (Block S134), such as via indicator unit 32, processing circuitry 68, processor 70, communication interface 60 and/or radio interface 62, a radio resource control (RRC) priority parameter associated with one of an uplink-configured grant (UL-CG) configuration and a downlink-semipersistent assignment (DL-SPS) configuration. The method includes determining (Block S136), such as via indicator unit 32, processing circuitry 68, processor 70, communication interface 60 and/or radio interface 62, a use of a priority indicator field in a downlink control information (DCI) message. The method includes signaling (Block S138), such as via indicator unit 32, processing circuitry 68, processor 70, communication interface 60 and/or radio interface 62, the DCI message including the priority indicator field according to the determined use, the DCI being associated with the one of the UL-CG and DL-SPS configuration.

In some embodiments, the priority indication field in the DCI is used for one or more of: validation of an activation/release of the one of the UL-CG and DL-SPS configuration; differentiating between an activation/release message and a re-transmission message; indicating a relative priority among overlapping resources having a same priority; indicating a priority mapping set; overriding a priority level indicated by the RRC priority parameter; and/or indicating a parameter unrelated to priority.

In some embodiments, for validation of activation/release of the one of the UL-CG and DL-SPS configuration, the priority indication field is expected to indicate a priority level that is a same as a priority level indicated in a radio resource control (RRC) priority parameter associated with the one of the UL-CG and DL-SPS configuration. In some embodiments, the method further includes configuring, such as via indicator unit 32, processing circuitry 68, processor 70, communication interface 60 and/or radio interface 62, a number of bits in the priority indicator field in the DCI. In some embodiments, the method includes determining, such as via indicator unit 32, processing circuitry 68, processor 70, communication interface 60 and/or radio interface 62, the use of the priority indicator field in the DCI message based on a pre-defined rule. In some embodiments, the method includes determining, such as via indicator unit 32, processing circuitry 68, processor 70, communication interface 60 and/or radio interface 62, the use of the priority indicator field in the DCI message based at least in part on at least one of a radio network temporary identifier (RNTI) used for the DCI message, a control resource set (CORESET) used for the DCI message, a search space used for the DCI message and/or a DCI format of the DCI message.

Figure 8:
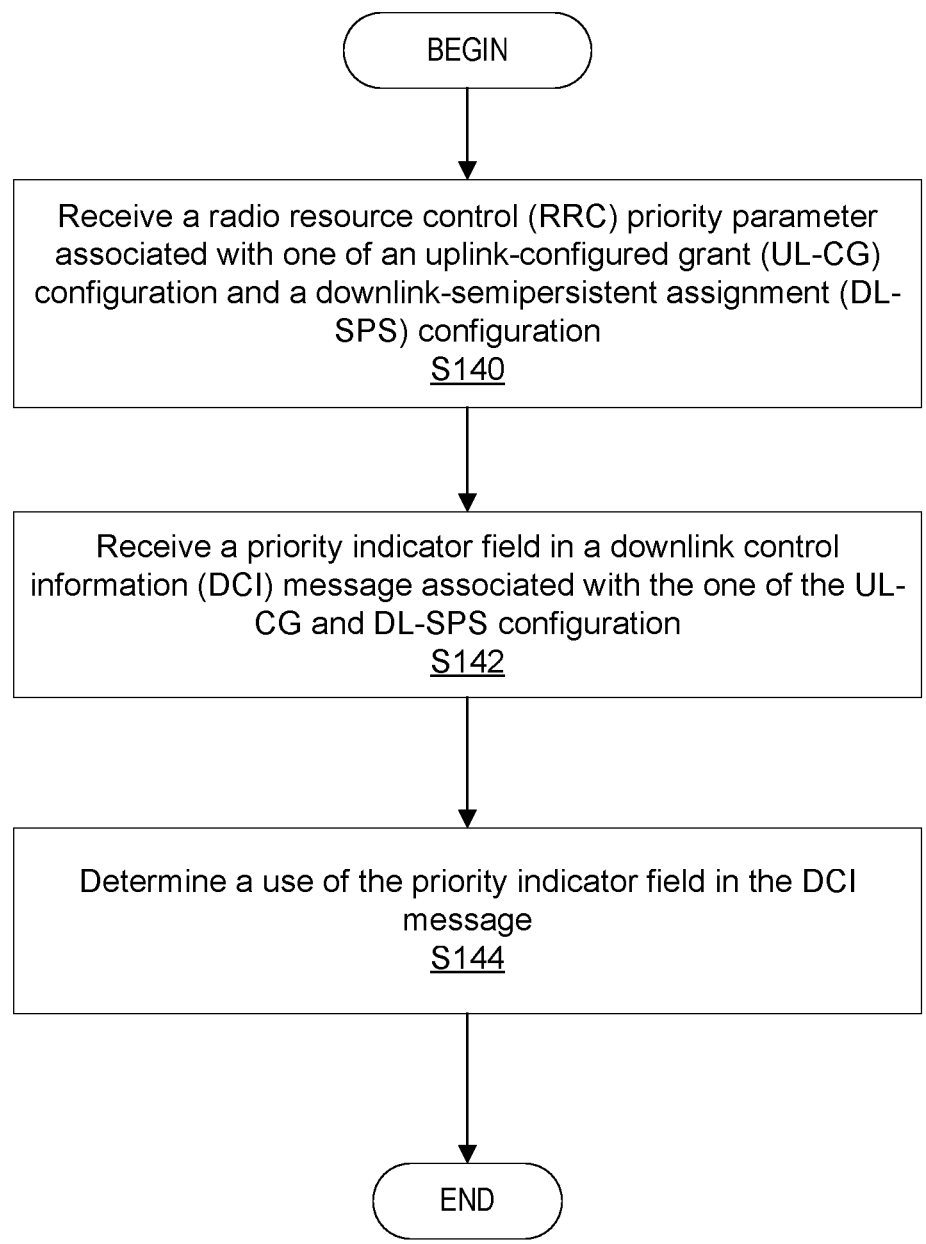
FIG. 8 is a flowchart of an exemplary process in a wireless device for determiner unit according to some embodiments of the present disclosure.

FIG. 8 is a flowchart of an exemplary process in a wireless device 22 according to some embodiments of the present disclosure. One or more Blocks and/or functions and/or methods performed by WD 22 may be performed by one or more elements of WD 22 such as by determiner unit 34 in processing circuitry 84, processor 86, radio interface 82, etc. The example method includes receiving (Block S140), such as via determiner unit 34, processing circuitry 84, processor 86 and/or radio interface 82, a radio resource control (RRC) priority parameter associated with one of an uplink-configured grant (UL-CG) configuration and a downlink-semipersistent assignment (DL-SPS) configuration. The method includes receiving (Block S142), such as via determiner unit 34, processing circuitry 84, processor 86 and/or radio interface 82, a priority indicator field in a downlink control information (DCI) message associated with the one of the UL-CG and DL-SPS configuration. The method includes determining (Block S144), such as via determiner unit 34, processing circuitry 84, processor 86 and/or radio interface 82, a use of the priority indicator field in the DCI message.

In some embodiments, the priority indication field in the DCI is used for one or more of: validation of an activation/release of the one of the UL-CG and DL-SPS configuration; differentiating between an activation/release message and a re-transmission message; indicating a relative priority among overlapping resources having a same priority; indicating a priority mapping set; overriding a priority level indicated by the RRC priority parameter; and/or indicating a parameter unrelated to priority.

In some embodiments, for validation of activation/release of the one of the UL-CG and DL-SPS configuration, the priority indication field is expected to indicate a priority level that is a same as a priority level indicated in a radio resource control (RRC) priority parameter associated with the one of the UL-CG and DL-SPS configuration. In some embodiments, the method further includes receiving, such as via determiner unit 34, processing circuitry 84, processor 86 and/or radio interface 82, a configuration of a number of bits in the priority indicator field in the DCI. In some embodiments, the method includes determining, such as via determiner unit 34, processing circuitry 84, processor 86 and/or radio interface 82, the use of the priority indicator field in the DCI message based on a pre-defined rule. In some embodiments, the method includes determining, such as via determiner unit 34, processing circuitry 84, processor 86 and/or radio interface 82, the use of the priority indicator field in the DCI message based at least in part on at least one of a radio network temporary identifier (RNTI) used for the DCI message, a control resource set (CORESET) used for the DCI message, a search space used for the DCI message and/or a DCI format of the DCI message.

Figure 9:
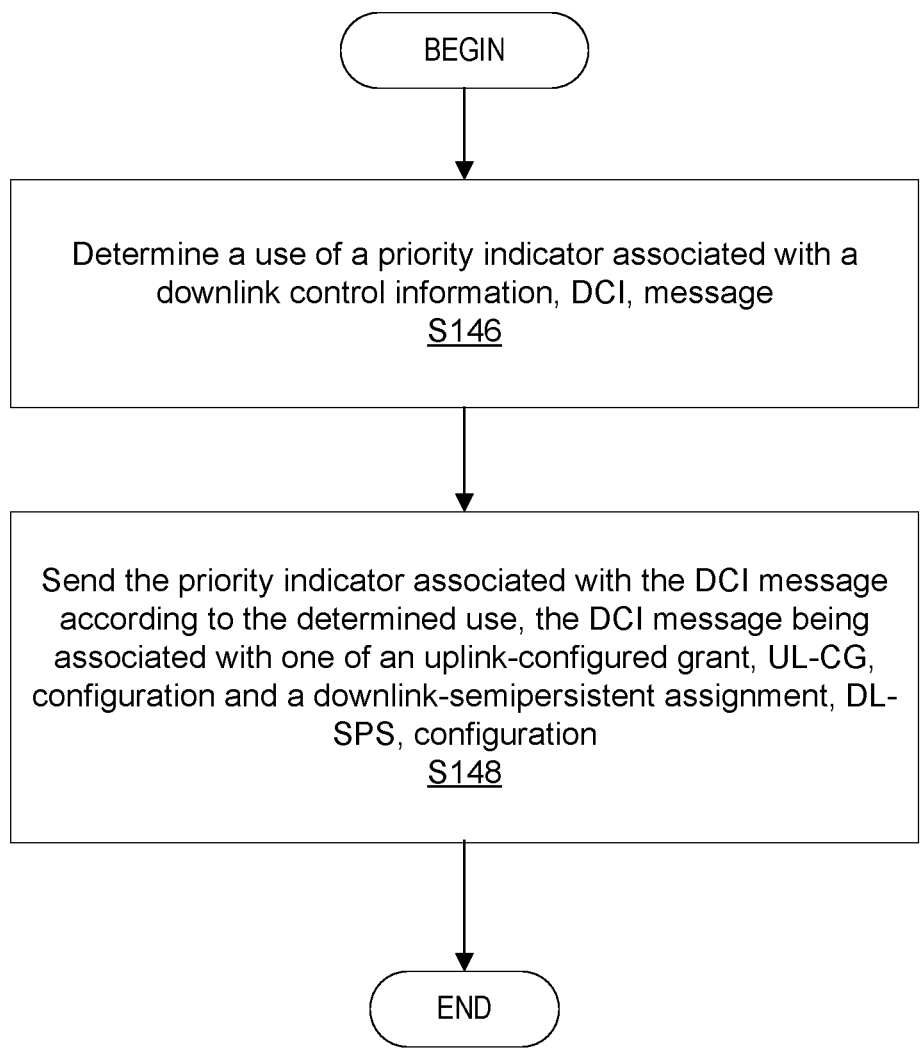
FIG. 9 is a flowchart of an exemplary process in a network node for indicator unit according to some embodiments of the present disclosure.
Figure 10:
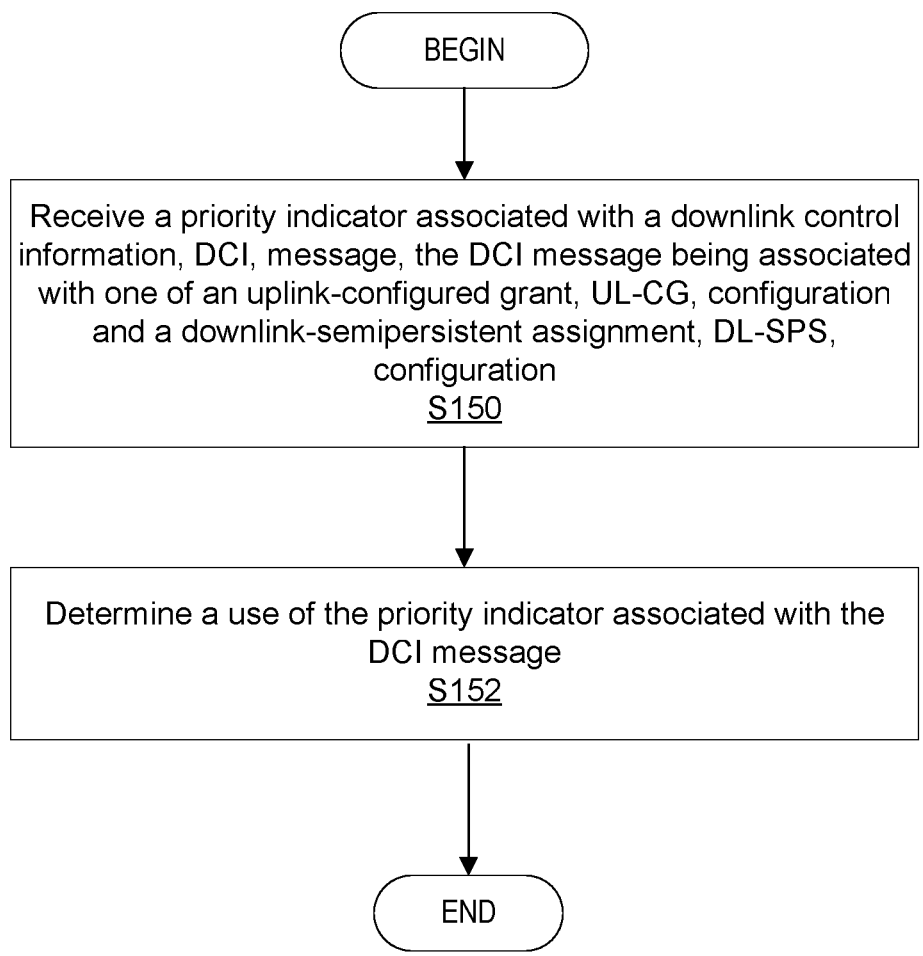
FIG. 10 is a flowchart of an exemplary process in a wireless device for determiner unit according to some embodiments of the present disclosure.

FIG. 9 is a flowchart of an exemplary process in a network node 16 according to some embodiments of the present disclosure. One or more Blocks and/or functions and/or methods performed by the network node 16 may be performed by one or more elements of network node 16 such as by indicator unit 32 in processing circuitry 68, processor 70, communication interface 60, radio interface 62, etc. according to the example method. The example method includes determining (Block S146), such as via indicator unit 32 in processing circuitry 68, processor 70, communication interface 60 and/or radio interface 62, a use of a priority indicator associated with a downlink control information, DCI, message. The method includes sending (Block S148), such as via indicator unit 32 in processing circuitry 68, processor 70, communication interface 60 and/or radio interface 62, the priority indicator associated with the DCI message according to the determined use, the DCI message being associated with one of an uplink-configured grant, UL-CG, configuration and a downlink-semipersistent assignment, DL-SPS, configuration.

In some embodiments, the priority indicator includes a field in the DCI message. In some embodiments, the method further includes sending, such as via indicator unit 32 in processing circuitry 68, processor 70, communication interface 60 and/or radio interface 62, a radio resource control, RRC, parameter, the RRC parameter indicating a size of the priority indicator field in the DCI message. In some embodiments, the size corresponds to a number of bits between 0 and n, n being a number greater than 0. In some embodiments, the RRC parameter is comprised in one of a physical uplink shared channel, PUSCH, configuration and a physical downlink shared channel, PDSCH, configuration. In some embodiments, the method further includes sending, such as via indicator unit 32 in processing circuitry 68, processor 70, communication interface 60 and/or radio interface 62, a radio resource control, RRC, parameter, the RRC parameter indicating a size of a priority indicator field in a DCI message associated with a dynamic scheduling of the wireless device.

In some embodiments, a size of the priority indicator field in the DCI message associated with the one of the UL-CG configuration and the DL-SPS configuration is a fixed size. In some embodiments, determining the use comprises determining, such as via indicator unit 32 in processing circuitry 68, processor 70, communication interface 60 and/or radio interface 62, the use of the priority indicator based at least in part on at least one of: a radio network temporary identifier associated with the DCI message, a search space associated with the DCI message, a control resource set, CORESET, associated with the DCI message, a DCI format of the DCI message and a size of the DCI message.

In some embodiments, determining the use comprises determining, such as via indicator unit 32 in processing circuitry 68, processor 70, communication interface 60 and/or radio interface 62, the use of the priority indicator based at least in part on a pre-defined rule. In some embodiments, determining the use comprises determining, such as via indicator unit 32 in processing circuitry 68, processor 70, communication interface 60 and/or radio interface 62, to use the priority indicator to indicate whether the DCI message corresponds to an activation or a release of the one of the UL-CG configuration and the DL-SPS configuration. In some embodiments, determining the use comprises determining, such as via indicator unit 32 in processing circuitry 68, processor 70, communication interface 60 and/or radio interface 62, to use the priority indicator to validate one of an activation and a release of the one of the UL-CG configuration and the DL-SPS configuration.

In some embodiments, determining the use comprises determining, such as via indicator unit 32 in processing circuitry 68, processor 70, communication interface 60 and/or radio interface 62, to use the priority indicator to indicate whether the DCI message corresponds to an activation/release of the one of the UL-CG configuration and the DL-SPS configuration, or a re-transmission request associated with the one of the UL-CG configuration and the DL-SPS configuration based at least in part on the priority indicator. In some embodiments, determining the use comprises determining, such as via indicator unit 32 in processing circuitry 68, processor 70, communication interface 60 and/or radio interface 62, to use the priority indicator to indicate a relative priority among one of a plurality of UL-CG configurations and a plurality of DL-SPS configurations having a same priority.

In some embodiments, determining the use comprises determining, such as via indicator unit 32 in processing circuitry 68, processor 70, communication interface 60 and/or radio interface 62, to use the priority indicator to at least one of: indicate a physical channel, PHY, priority to logical channel, LCH, priority mapping set; indicate a DCI priority to logical channel, LCH, priority mapping set; override a priority indicated by a radio resource control, RRC, priority parameter; and/or indicate a parameter unrelated to priority. In some embodiments, the method further comprises sending, such as via indicator unit 32 in processing circuitry 68, processor 70, communication interface 60 and/or radio interface 62, a radio resource control, RRC, priority parameter associated with the one of the UL-CG configuration and the DL-SPS configuration.

In some embodiments, the method further comprises determining, such as via indicator unit 32 in processing circuitry 68, processor 70, communication interface 60 and/or radio interface 62, a relative priority order between at least two of: a first priority indicated by a radio resource control, RRC, priority parameter associated with the one of the UL-CG configuration and the DL-SPS configuration; a second priority indicated by the priority indicator in the DCI message; a third priority for a re-transmission associated with the one of the UL-CG configuration and the DL-SPS configuration; and a fourth priority for a dynamic transmission. In some embodiments, the method further comprises determining, such as via indicator unit 32 in processing circuitry 68, processor 70, communication interface 60 and/or radio interface 62, the relative priority order based at least in part on a pre-defined rule. In some embodiments, the third priority for the re-transmission is a same as one of the second priority and the first priority. In some embodiments, the priority indicator includes at least one of: a radio network temporary identifier associated with the DCI message, a search space associated with the DCI message, a control resource set, CORESET, associated with the DCI message, a DCI format of the DCI message and a size of the DCI message.

FIG. 9 is a flowchart of an exemplary process in a wireless device 22 according to some embodiments of the present disclosure. One or more Blocks and/or functions and/or methods performed by WD 22 may be performed by one or more elements of WD 22 such as by determiner unit 34 in processing circuitry 84, processor 86, radio interface 82, etc. The example method includes receiving (Block S150), such as via determiner unit 34 in processing circuitry 84, processor 86 and/or radio interface 82, a priority indicator associated with a downlink control information, DCI, message, the DCI message being associated with one of an uplink-configured grant, UL-CG, configuration and a downlink-semipersistent assignment, DL-SPS, configuration. The method includes determining (Block S152), such as via determiner unit 34 in processing circuitry 84, processor 86 and/or radio interface 82, a use of the priority indicator associated with the DCI message.

In some embodiments, the priority indicator includes a field in the DCI message. In some embodiments, the method includes receiving, such as via determiner unit 34 in processing circuitry 84, processor 86 and/or radio interface 82, a radio resource control, RRC, parameter, the RRC parameter indicating a size of the priority indicator field in the DCI message. In some embodiments, the size corresponds to a number of bits between 0 and n, n being a number greater than 0. In some embodiments, the RRC parameter is comprised in one of a physical uplink shared channel, PUSCH, configuration and a physical downlink shared channel, PDSCH, configuration. In some embodiments, the method further includes receiving, such as via determiner unit 34 in processing circuitry 84, processor 86 and/or radio interface 82, a radio resource control, RRC, parameter, the RRC parameter indicating a size of a priority indicator field in a DCI message associated with a dynamic scheduling of the wireless device.

In some embodiments, a size of the priority indicator field in the DCI message associated with the one of the UL-CG configuration and the DL-SPS configuration is a fixed size. In some embodiments, determining the use comprises determining, such as via determiner unit 34 in processing circuitry 84, processor 86 and/or radio interface 82, the use of the priority indicator based at least in part on at least one of: a radio network temporary identifier associated with the DCI message, a search space associated with the DCI message, a control resource set, CORESET, associated with the DCI message, a DCI format of the DCI message and a size of the DCI message. In some embodiments, determining the use comprises determining, such as via determiner unit 34 in processing circuitry 84, processor 86 and/or radio interface 82, the use of the priority indicator based at least in part on a pre-defined rule. In some embodiments, the method further includes using the priority indicator according to the determined use.

In some embodiments, using the priority indicator comprises using, such as via determiner unit 34 in processing circuitry 84, processor 86 and/or radio interface 82, the priority indicator to determine whether the DCI message corresponds to an activation or a release of the one of the UL-CG configuration and the DL-SPS configuration. In some embodiments, using the priority indicator comprises using, such as via determiner unit 34 in processing circuitry 84, processor 86 and/or radio interface 82, the priority indicator to validate one of an activation and a release of the one of the UL-CG configuration and the DL-SPS configuration. In some embodiments, using the priority indicator comprises using the priority indicator to determine, such as via determiner unit 34 in processing circuitry 84, processor 86 and/or radio interface 82, whether the DCI message corresponds to an activation/release of the one of the UL-CG configuration and the DL-SPS configuration, or a re-transmission request associated with the one of the UL-CG configuration and the DL-SPS configuration based at least in part on the priority indicator.

In some embodiments, using the priority indicator comprises using the priority indicator to determine, such as via determiner unit 34 in processing circuitry 84, processor 86 and/or radio interface 82, a relative priority among one of a plurality of UL-CG configurations and a plurality of DL-SPS configurations having a same priority. In some embodiments, using the priority indicator comprises at least one of: using the priority indicator to indicate, such as via determiner unit 34 in processing circuitry 84, processor 86 and/or radio interface 82, a physical channel, PHY, priority to logical channel, LCH, priority mapping set; using the priority indicator to indicate a DCI priority to logical channel, LCH, priority mapping set; overriding a priority indicated by a radio resource control, RRC, priority parameter; and/or using the priority indicator to indicate, such as via determiner unit 34 in processing circuitry 84, processor 86 and/or radio interface 82, a parameter unrelated to priority.

In some embodiments, the method further includes receiving, such as via determiner unit 34 in processing circuitry 84, processor 86 and/or radio interface 82, a radio resource control, RRC, priority parameter associated with the one of the UL-CG configuration and the DL-SPS configuration. In some embodiments, the method further includes determining, such as via determiner unit 34 in processing circuitry 84, processor 86 and/or radio interface 82, a relative priority order between at least two of: a first priority indicated by a radio resource control, RRC, priority parameter associated with the one of the UL-CG configuration and the DL-SPS configuration; a second priority indicated by the priority indicator in the DCI message; a third priority for a re-transmission associated with the one of the UL-CG configuration and the DL-SPS configuration; and a fourth priority for a dynamic transmission.

In some embodiments, the method further includes determining, such as via determiner unit 34 in processing circuitry 84, processor 86 and/or radio interface 82, the relative priority order based at least in part on a pre-defined rule. In some embodiments, the third priority for the re-transmission is a same as one of the second priority and the first priority. In some embodiments, the priority indicator includes at least one of: a radio network temporary identifier associated with the DCI message, a search space associated with the DCI message, a control resource set, CORESET, associated with the DCI message, a DCI format of the DCI message and a size of the DCI message.

Having described the general process flow of arrangements of the disclosure and having provided examples of hardware and software arrangements for implementing the processes and functions of the disclosure, the sections below provide details and examples of arrangements for efficient use of priority indication configuration associated with configured grant/semi-persistent (CG/SPS) transmission, which may be implemented by the network node 16, wireless device 22 and/or host computer 24.

Methods to Indicate a Configuration Among Multiple Configuration of UL-CG and/or DL-SPS In some embodiments, the priority indicator field associated with DCI may be used for validation (e.g., by WD 22 or network node 16) in activation and release DCIs of UL-CG and/or DL-SPS configuration(s). In some embodiments, the priority indicator associated with DCI can include one or more of the following arrangements: bit in the DCI, radio network temporary identifier (RNTI), non-overlapping search space, control resource set (CORESET) and/or DCI formats with different sizes.

In one example, the priority indicator associated with DCI does not having a meaning of priority. Rather the priority indicator may be used to differentiate activation verses release. For example, the priority indicator taking one value (e.g., '0' or '00 . . . 0') indicates activation, while the priority indicator taking another value (e.g., '1' or '11 . . . 1') indicates release. If the priority indicator does not have an expected value during physical downlink control channel detection (PDCCH) detection, then the validation of activation or release is not achieved, and the WD 22 may determine that the DCI format has been detected with a non-matching cyclic redundancy check (CRC).

In another example, the priority indicator associated with DCI does indicate priority. The priority indicator in DCI may be expected to match the priority level that is RRC configured for the relevant UL-CG (Type 2) or DL-SPS configuration, when the DCI is used to activate or release the relevant configuration. If the priority indicator carried by a detected DCI does not match the RRC configured priority level, then the validation of activation or release is not achieved, and the WD 22 may determine that the DCI format has been detected with a non-matching CRC.

In some embodiments, the priority indicator field is an optional field in the DCI format. An RRC parameter may be used (e.g., by network node 16) to configure the number bits in the priority indication field in DCI. The RRC parameter may indicate that the priority indication field has 0 bits, i.e., the priority indication field is absent in the DCI. Alternatively, the RRC parameter may indicate that the priority indication field is n bits, thus allowing the priority indication field to point to $2^n$ different priority levels. For example, when n=2, the priority indication bits in DCI are configurable to values {0, 1, 2, 3}.

The RRC parameter may be called, for example, Priority_indication_number_of_bits.

In some embodiments, this RRC parameter can be part of PUSCH configuration for indicating the priority indicator field size in DCI formats that schedules PUSCH transmission (e.g., DCI format 0_1 and 0_2). In some embodiments, the RRC parameter can be part of physical downlink shared channel (PDSCH) configuration for indicating the priority indicator field size in DCI formats that schedules PDSCH transmission (e.g., DCI format 1_1 and 1_2).

In some embodiments, several instances of this RRC parameter can be introduced, one for each DCI format that contains an optional, configurable, field for priority indication. For example, Priority_indication_number_of_bits_forDCIFormat0_1, and Priority_indication_number_of_bits_forDCIFormat0_2 for DCI formats of PUSCH transmission; and Priority_indication_number_of_bits_forDCIFormat1_1, and Priority_indication_number_of_bits_forDCIFormat1_2 for DCI formats of PDSCH transmission.

In one embodiment, the RRC parameter(s) is applied (e.g., by network node 16) for DCI that dynamically schedules PUSCH or PDSCH transmission, as well as, DCIs that activate or release semi-statically scheduled PUSCH (i.e., UL-CG PUSCH) or PDSCH (i.e., DL-SPS PDSCH) configurations. For example, one RRC parameter, namely, 'Priority_indication_number_of_bits_forDCIFormat0_2' can be used to determine the number of bits for the priority indication field of DCI format 0_2, regardless of whether DCI format 0_2 is used for dynamical scheduling of a PUSCH, or activation/release of a UL-CG configuration. Similarly, one RRC parameter 'Priority_indication_number_of_bits_forDCIFormat1_2' can be used to determine the number of bits for the priority indication field of DCI format 1_2, regardless of whether DCI format 1_2 is used for dynamical scheduling of a PDSCH, or activation/release of a DL-SPS configuration.

In one embodiment, the RRC parameter(s) is only applied (e.g., by network node 16) for DCI that dynamically schedules PUSCH or PDSCH transmission, and is not applicable for DCIs that activates or releases semi-statically scheduled PUSCH (i.e., UL-CG PUSCH) or PDSCH (i.e., DL-SPS PDSCH). For example, for DCIs that are used to activate or release UL-CG/DL-SPS, the priority indicator field always has a fixed number of bits (including zero bits).

In some embodiments, the priority indicator bit(s) is used for differentiating (e.g., by network node 16 and/or WD 22) between activation and re-transmission messages.

In one embodiment, the priority indicator field for activation DCI indicates a relative priority among overlapping SPSs/CGs when the overlapping SPSs/CGs have the same priority. For example, if an LCH with the highest LCH-priority is allowed on two overlapping CGs, for example CG1 and CG2, then both CGs have same priority in MAC Logical Channel Prioritization (LCP) procedure. On the other hand, if, for example, the priority indicator for activation DCI for CG2 indicates a higher priority than the priority indicator for activation DCI for CG1, then CG2 is selected by the WD 22. However, if the LCP procedure determines that CG1 is prioritized, then CG1 is selected by the WD 22 irrespectively of the (relative) priority indicator for activation DCI.

In one embodiment, the priority indicator field in DCI can be used (e.g., by network node 16 and/or WD 22) alongside the priority indicated in RRC to expand the range of priorities in case e.g., traffic has a range of priorities.

In one embodiment, for the same CG, an activation DCI can be sent for N prioritized-traffic types, given that the priority bits have the ability to indicate N code-spaces. For example, if priority bit is of 1 bit, the network node 16 can send an activation DCI for CG1 for Ultra-reliable low latency communication 1 (URLLC1) (with priority bit 0) and URLLC2 traffic (with priority bit 1). The URLLC1 may use a left-over grant (URLLC2 is prioritized).

In some embodiments, the priority indicator field in the activation DCI for CG PUSCH is used to indicate the PHY priority-to-LCH priority mapping set.

It was considered in 3GPP Release 16 (Rel-16) that 2-level PHY priority of CG PUSCH may be determined by an explicit indication in each CG configuration for type 2 CG PUSCH. This PHY priority may be used for PHY-layer collision handling or for mapping data from appropriate MAC logical channel (LCH) priority (e.g., with priority corresponding to the characteristics of the activated CG) to the activated CG PUSCH. For the latter purpose, there can exist at least one mapping sets from the MAC LCH priority to the PHY priority since the LCH priority can take a value from 1 to 16. For example, for 2-level PHY priority in Rel-16, a mapping set would be mapping from 16 different LCH priorities to 2 levels PHY priorities.

In some cases, there can be N different LCH priority to the PHY priority mapping sets configured in the higher layer. Table 1 below illustrates an example of when N=4 mapping sets are configured.

TABLE 1

| Mapping set ID | PHY priority-to-LCH priority mapping |
|---|---|
| 0 | PHY priority = 0 → LCH priority 1-8 |
|   | PHY priority = 1 → LCH priority 9-16 |
| 1 | PHY priority = 0 → LCH priority 1-16 |
|   | PHY priority = 1 → LCH priority 9-16 |
| 2 | PHY priority = 0 → LCH priority 1-16 |
|   | PHY priority = 1 → LCH priority 13-16 |
| 3 | PHY priority = 0 → LCH priority 1-16 |
|   | PHY priority = 1 → LCH priority 16 |

In some embodiments, if the activation DCI for CG PUSCH includes a priority field (e.g., with field size determined according to the configured parameter as described in Embodiment 2) and the field size is larger than or equal to $ceil(\log_2(N))$, then $ceil(\log_2(N))$ most significant bit (MSB) or least significant bit (LSB) of the priority field may be used to indicate the PHY priority-to-LCH priority mapping set.

In another embodiment, there may be one PHY priority-to-LCH priority mapping set, and additionally another mapping from DCI priority-to-LCH priority. The size of the latter mapping may depend on the size (e.g., number of bits) of the priority indicator field in the activation DCI for CG PUSCH. In this case, the priority indicator field in the DCI may be used to further filter the allowed LCH of which the data can be transmitted on the activated CG PUSCH. That is, the allowed LCH of which the data can be transmitted on the activated CG PUSCH may be a result of an intersection between allowed LCH determined from the PHY priority-to-LCH priority mapping and DCI priority-to-LCH priority mapping.

For example, if the PHY priority-to-LCH priority mapping set is such that PHY priority=0→LCH priority 1-8 and PHY priority=1→LCH priority 9-16, and there exists another DCI priority-to-LCH priority as shown in example Table 2 below. If the priority indicator field in the DCI activating CG PUSCH with PHY priority=0 indicates priority value 00, then the allowed LCHs of which data can be transmitted on the activated CG PUSCH is LCH with priority 1-4.

TABLE 2

| Priority in the activation DCI | LCH priority |
| --- | --- |
| 00 | 1-4 |
| 01 | 5-8 |
| 10 | 9-12 |
| 11 | 13-16 |

Determining Usage of Priority Indication

In some embodiments, the transmission on uplink (UL) or downlink (DL) can be associated with urgent traffic data, system information, paging, non-urgent traffic data, etc. The network node 16 may schedule the transmission by dedicated physical downlink control channel (PDCCH) for dynamic scheduling, semi-persistent scheduling or broadcasting signaling, such as, system information and paging.

In some embodiments, how, e.g., the network node 16 or WD 22 applies and/or determines the priority (e.g., to data/traffic to be scheduled and/or transmitted to and/or from the WD 22) can be dependent on and/or based at least in part on RNTI, CORESET, search space and/or DCI format.

In some embodiments, physical indication of priorities may be only applicable and used (e.g., by WD 22 or network node 16) when there is a collision between different dedicated data traffic. For example, in some embodiments, the priority indication may only take effect or be used in one or more cases:
- if the PDCCH is detected (e.g. by WD 22) in UESS (UE specific search space);
- if the PDCCH is scrambled with WD 22 specific RNTIs, e.g., Cell RNTI (C-RNTI), configured scheduled RNTI (CS-RNTI), modulation and coding scheme RNTI (MCS-C-RNTI), semi-persistent channel state information RNTI (SP-CSI-RNTI), etc.; and/or
- if the PDCCH is with DCI format 0_1, 0_2, 1_1 or 1_2.

In some embodiments, for system information updates, paging messages or random access (RA) response, scheduled by a PDCCH scrambled with system information RNTI (SI-RNTI), paging RNTI (P-RNTI), or random access RNTI (RA-RNTI) correspondently, and the associated PDSCH messages if any, may always have the highest priority regardless of the priority indication indicated by control resource set (CORESET), search space, bit field in DCI or semi-persistently configured by higher layer.

Priority Decision Order for Dynamic Transmission, CG/SPS, CG/SPS Retransmission/Reception Some embodiments include denoting the priority configured by RRC for CG/SPS as: RRC_SP_high, RRC_SP_low.

Some embodiments include denoting the priority for dynamic transmission and indicated by PHY indication as: PHY_high, PHY_low.

In some embodiments, if the priority configuration in the RRC is absent for CG/SPS, the priority for the CG/SPS transmission/reception may be determined (e.g., by WD 22) to be RRC_SP_low.

In some embodiments, if the priority indicated by PHY indication is not configured/absent, or it is not configurable as in DCI 0_0/DCI 1_0, the priority for the dynamic transmission/reception may be determined (e.g., by WD 22) to be PHY_low.

In some embodiments, the retransmission of CG or SPS, scheduled by PDCCH scrambled with CS-RNTI,
- is determined (e.g., by WD 22 and/or network node 16) to have the same priority as indicated in the scheduling DCI, regardless of the RRC configuration associated with the CG/SPS configuration; and/or
- alternatively, is always applied (e.g., by WD 22 and/or network node 16) to the retransmission with same priority as the RRC configuration associated with the CG/SPS configuration.

In some embodiments, if there is a transmission/reception collision, the priority may be determined (e.g., by WD 22 and/or indicated by network node 16) according to: PHY_high>RRC_SP_high>PHY_low>RRC_SP_low.

Some embodiments may include one or more of the following:

Embodiment A1. A network node configured to communicate with a wireless device (WD), the network node configured to, and/or comprising a radio interface and/or comprising processing circuitry configured to one or more of:
- signal a radio resource control (RRC) priority parameter associated with one of an uplink-configured grant (UL-CG) configuration and a downlink-semipersistent assignment (DL-SPS) configuration;
- determine a use of a priority indicator field in a downlink control information (DCI) message; and
- signal the DCI message including the priority indicator field according to the determined use, the DCI being associated with the one of the UL-CG and DL-SPS configuration.

Embodiment A2. The network node of Embodiment A1, wherein the priority indication field in the DCI is used for one or more of:
- validation of an activation/release of the one of the UL-CG and DL-SPS configuration;
- differentiating between an activation/release message and a re-transmission message;
- indicating a relative priority among overlapping resources having a same priority;
- indicating a priority mapping set;
- overriding a priority level indicated by the RRC priority parameter; and/or indicating a parameter unrelated to priority.

Embodiment A3. The network node of any one of Embodiments A1 and A2, wherein, for validation of activation/release of the one of the UL-CG and DL-SPS configuration, the priority indication field is expected to indicate a priority level that is a same as a priority level indicated in a radio resource control (RRC) priority parameter associated with the one of the UL-CG and DL-SPS configuration.

Embodiment A4. The network node of any one of Embodiments A1-A3, wherein the network node and/or the radio interface and/or the processing circuitry is configured to one or more of:
- configure a number of bits in the priority indicator field in the DCI;
- determine the use of the priority indicator field in the DCI message based on a pre-defined rule; and/or
- determine the use of the priority indicator field in the DCI message based at least in part on at least one of a radio network temporary identifier (RNTI) used for the DCI message, a control resource set (CORESET) used for the DCI message, a search space used for the DCI message and/or a DCI format of the DCI message.

Embodiment B1. A method implemented in a network node, the method comprising one or more of:
signaling a radio resource control (RRC) priority parameter associated with one of an uplink-configured grant (UL-CG) configuration and a downlink-semipersistent assignment (DL-SPS) configuration;
determining a use of a priority indicator field in a downlink control information (DCI) message; and
signaling the DCI message including the priority indicator field according to the determined use, the DCI being associated with the one of the UL-CG and DL-SPS configuration.

Embodiment B2. The method of Embodiment B1, wherein the priority indication field in the DCI is used for one or more of:
validation of an activation/release of the one of the UL-CG and DL-SPS configuration;
differentiating between an activation/release message and a re-transmission message;
indicating a relative priority among overlapping resources having a same priority;
indicating a priority mapping set;
overriding a priority level indicated by the RRC priority parameter; and/or
indicating a parameter unrelated to priority.

Embodiment B3. The method of any one of Embodiments B1 and B2, wherein, for validation of activation/release of the one of the UL-CG and DL-SPS configuration, the priority indication field is expected to indicate a priority level that is a same as a priority level indicated in a radio resource control (RRC) priority parameter associated with the one of the UL-CG and DL-SPS configuration.

Embodiment B4. The method of any one of Embodiments B1-B3, further comprising one or more of:
configuring a number of bits in the priority indicator field in the DCI;
determining the use of the priority indicator field in the DCI message based on a pre-defined rule; and/or
determining the use of the priority indicator field in the DCI message based at least in part on at least one of a radio network temporary identifier (RNTI) used for the DCI message, a control resource set (CORESET) used for the DCI message, a search space used for the DCI message and/or a DCI format of the DCI message.

Embodiment C1. A wireless device (WD) configured to communicate with a network node, the WD configured to, and/or comprising a radio interface and/or processing circuitry configured to one or more of:
receive a radio resource control (RRC) priority parameter associated with one of an uplink-configured grant (UL-CG) configuration and a downlink-semipersistent assignment (DL-SPS) configuration;
receive a priority indicator field in a downlink control information (DCI) message associated with the one of the UL-CG and DL-SPS configuration; and
determine a use of the priority indicator field in the DCI message.

Embodiment C2. The WD of Embodiment C1, wherein the priority indication field in the DCI is used for one or more of:
validation of an activation/release of the one of the UL-CG and DL-SPS configuration;
differentiating between an activation/release message and a re-transmission message;
indicating a relative priority among overlapping resources having a same priority;
indicating a priority mapping set;
overriding a priority level indicated by the RRC priority parameter; and/or
indicating a parameter unrelated to priority.

Embodiment C3. The WD of any one of Embodiments C1 and C2, wherein, for validation of activation/release of the one of the UL-CG and DL-SPS configuration, the priority indication field is expected to indicate a priority level that is a same as a priority level indicated in a radio resource control (RRC) priority parameter associated with the one of the UL-CG and DL-SPS configuration.

Embodiment C4. The WD of any one of Embodiments C1-C3, wherein the wireless device and/or the radio interface and/or the processing circuitry is configured to one or more of:
receive a configuration of a number of bits in the priority indicator field in the DCI;
determine the use of the priority indicator field in the DCI message based on a pre-defined rule; and/or
determine the use of the priority indicator field in the DCI message based at least in part on at least one of a radio network temporary identifier (RNTI) used for the DCI message, a control resource set (CORESET) used for the DCI message, a search space used for the DCI message and/or a DCI format of the DCI message.

Embodiment D1. A method implemented in a wireless device (WD), the method comprising one or more of:
receiving a radio resource control (RRC) priority parameter associated with one of an uplink-configured grant (UL-CG) configuration and a downlink-semipersistent assignment (DL-SPS) configuration;
receiving a priority indicator field in a downlink control information (DCI) message associated with the one of the UL-CG and DL-SPS configuration; and
determining a use of the priority indicator field in the DCI message.

Embodiment D2. The method of Embodiment D1, wherein the priority indication field in the DCI is used for one or more of:
validation of an activation/release of the one of the UL-CG and DL-SPS configuration;
differentiating between an activation/release message and a re-transmission message;
indicating a relative priority among overlapping resources having a same priority;
indicating a priority mapping set;
overriding a priority level indicated by the RRC priority parameter; and/or
indicating a parameter unrelated to priority.

Embodiment D3. The method of any one of Embodiments D1 and D2, wherein, for validation of activation/release of the one of the UL-CG and DL-SPS configuration, the priority indication field is expected to indicate a priority level that is a same as a priority level indicated in a radio resource control (RRC) priority parameter associated with the one of the UL-CG and DL-SPS configuration.

Embodiment D4. The method of any one of Embodiments D1-D3, further comprising one or more of:
receiving a configuration of a number of bits in the priority indicator field in the DCI;
determining the use of the priority indicator field in the DCI message based on a pre-defined rule; and/or
determining the use of the priority indicator field in the DCI message based at least in part on at least one of a radio network temporary identifier (RNTI) used for the DCI message, a control resource set (CORESET) used for the DCI message, a search space used for the DCI message and/or a DCI format of the DCI message.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, may be construed to constitute a complete written description of all combinations and subcombinations of the embodiments described herein, and of the manner and process of making and using them, and may support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, the method comprising:
   receiving a priority indicator associated with a downlink control information, DCI, message, the DCI message being associated with one of an uplink-configured grant, UL-CG, configuration and a downlink-semipersistent assignment, DL-SPS, configuration;
   determining a use of the priority indicator associated with the DCI message; and
   using the priority indicator according to the determined use, the using of the priority indicator according to the determined use comprising using the priority indicator to determine a relative priority among one of a plurality of UL-CG configurations and a plurality of DL-SPS configurations having a same priority.

2. The method of claim 1, wherein the priority indicator includes a field in the DCI message.

3. The method of claim 2, further comprising:
   receiving a radio resource control, RRC, parameter, the RRC parameter indicating a size of the priority indicator field in the DCI message.

4. The method of claim 3, wherein the size corresponds to a number of bits between 0 and n, n being a number greater than 0.

5. The method of claim 2, further comprising:
   receiving a radio resource control, RRC, parameter, the RRC parameter indicating a size of a priority indicator field in a DCI message associated with a dynamic scheduling of the wireless device.

6. The method of claim 5, wherein a size of the priority indicator field in the DCI message associated with the one of the UL-CG configuration and the DL-SPS configuration is a fixed size.

7. The method of claim 1, wherein the RRC parameter is comprised in one of a physical uplink shared channel, PUSCH, configuration and a physical downlink shared channel, PDSCH, configuration.

8. The method of claim 1, wherein determining the use comprises determining the use of the priority indicator based at least in part on at least one of:
a radio network temporary identifier associated with the DCI message, a search space associated with the DCI message, a control resource set, CORESET, associated with the DCI message, a DCI format of the DCI message and a size of the DCI message.

9. The method of claim 1, wherein determining the use comprises determining the use of the priority indicator based at least in part on a pre-defined rule.

10. The method of claim 1, further comprising:
using the priority indicator according to the determined use, using the priority indicator comprises one of:
using the priority indicator to determine whether the DCI message corresponds to an activation or a release of the one of the UL-CG configuration and the DL-SPS configuration; and;
using the priority indicator to validate one of an activation and a release of the one of the UL-CG configuration and the DL-SPS configuration;
using the priority indicator to validate one of an activation and a release of the one of the UL-CG configuration and the DL-SPS configuration; and
using the priority indicator to determine whether the DCI message corresponds to an activation/release of the one of the UL-CG configuration and the DL-SPS configuration, or a re-transmission request associated with the one of the UL-CG configuration and the DL-SPS configuration based at least in part on the priority indicator.

11. The method of claim 10, wherein using the priority indicator comprises at least one of:
using the priority indicator to indicate a physical channel, PHY, priority to logical channel, LCH, priority mapping set;
using the priority indicator to indicate a DCI priority to logical channel, LCH, priority mapping set;
overriding a priority indicated by a radio resource control, RRC, priority parameter; and/or
using the priority indicator to indicate a parameter unrelated to priority.

12. The method of claim 1, further comprising:
receiving a radio resource control, RRC, priority parameter associated with the one of the UL-CG configuration and the DL-SPS configuration.

13. The method of claim 1, further comprising determining a relative priority order between at least two of:
a first priority indicated by a radio resource control, RRC, priority parameter associated with the one of the UL-CG configuration and the DL-SPS configuration;
a second priority indicated by the priority indicator in the DCI message;
a third priority for a re-transmission associated with the one of the UL-CG configuration and the DL-SPS configuration; and
a fourth priority for a dynamic transmission.

14. The method of claim 13, further comprising determining the relative priority order based at least in part on a pre-defined rule.

15. The method of claim 13, wherein the third priority for the re-transmission is a same as one of the second priority and the first priority.

16. The method of claim 1, wherein the priority indicator includes at least one of:
a radio network temporary identifier associated with the DCI message, a search space associated with the DCI message, a control resource set, CORESET, associated with the DCI message, a DCI format of the DCI message and a size of the DCI message.

17. A method implemented in a network node, the method comprising:
determining a use of a priority indicator associated with a downlink control information, DCI, message;
using the priority indicator according to the determined use, the using of the priority indicator according to the determined use comprising using the priority indicator to determine a relative priority among one of a plurality of uplink-configured grant, UL-CG, configurations and a plurality of downlink-semipersistent assignment, DL-SPS, configurations having a same priority; and
sending the priority indicator associated with the DCI message according to the determined use, the DCI message being associated with one of an UL-CG configuration and a DL-SPS configuration.

18. A wireless device configured to communicate with a network node, the wireless device comprising processing circuitry, the processing circuitry configured to cause the wireless device to:
receive a priority indicator associated with a downlink control information, DCI, message, the DCI message being associated with one of an uplink-configured grant, UL-CG, configuration and a downlink-semipersistent assignment, DL-SPS, configuration;
determine a use of the priority indicator associated with the DCI message; and
using the priority indicator according to the determined use, the using of the priority indicator according to the determined use comprising using the priority indicator to determine a relative priority among one of a plurality of UL-CG configurations and a plurality of DL-SPS configurations having a same priority.

19. A network node configured to communicate with a wireless device, the network node comprising processing circuitry, the processing circuitry configured to cause the network node to:
determine a use of a priority indicator associated with a downlink control information, DCI, message;
using the priority indicator according to the determined use, the using of the priority indicator according to the determined use comprising using the priority indicator to determine a relative priority among one of a plurality of uplink-configured grant, UL-CG, configurations and a plurality of downlink-semipersistent assignment, DL-SPS, configurations having a same priority; and
send the priority indicator associated with the DCI message according to the determined use, the DCI message being associated with one of an uplink-configured grant, UL-CG, configuration and a downlink-semipersistent assignment, DL-SPS, configuration.

* * * * *